Dec. 13, 1966  E. SCHATTER ET AL  3,292,060
VARIABLE CAPACITOR
Filed July 7, 1965

INVENTORS
Eckart Schatter &
Karl Schwarz
BY Spencer & Kaye
ATTORNEYS

United States Patent Office 3,292,060
Patented Dec. 13, 1966

3,292,060
VARIABLE CAPACITOR
Eckart Schatter, Ingolstadt, and Karl Schwarz, Eitensheim, Germany, assignors to Telefunken Patentverwertungsgesellschaft m.b.H., Ulm (Danube), Germany
Filed July 7, 1965, Ser. No. 470,177
Claims priority, application Germany, July 7, 1964,
T 26,524; Jan. 14, 1965, T 27,809
14 Claims. (Cl. 317—253)

The present invention relates to an electrical device and, more particularly, to a variable capacitor whose minimum capacitance is adjustable.

There exist multiple-set rotary capacitors each of which sets includes a stationary plate and a rotor plate. The rotor plates are stacked and ganged. The capacitor also has a plurality of trimmer capacitors which are carried by the capacitor casing, there being as many trimmer capacitors as there are sets with each trimmer capacitor being connected to a corresponding set, so that when the rotors are in their minimum capacitance position, the desired starting capacitance of each individual set can be adjusted. In order to enable each set to be calibrated so as to have the desired characteristics throughout the entire range; i.e., from minimum to maximum capacitance, the rotor plates are slit at the periphery; i.e., their edges are provided with approximately radially oriented slits so as to allow the individual edge portions to be bent to a greater or lesser extent, thereby to give each particular portion of the capacitance range the desired value.

There also exist rotary capacitors in which that portion of the rotor plate which, when the capacitor is rotated from its minimum capacitance position toward the maximum capacitance position in which the rotor and stator are opposite each other, initially comes into the space between two stator plates, is provided with small projections that are directed toward the stator. In this way, the rate at which the capacitance increases during the first part of the rotation is flattened out to a certain extent.

The above-described capacitors entail relatively large manufacturing costs, and it is, therefore, the primary object of the present invention to provide a rotary capacitor whose minimum capacitance is adjustable but which can be mass-produced at less cost, and with this object in view, the present invention resides, basically, in a variable capacitor which comprises two cooperating capacitor plates mounted for movement with respect to each other between a first position wherein the capacitance of the capacitor is at a minimum and a second position wherein the capacitance of the capacitor is at a maximum. One of the two capacitor plates has a main part and an auxiliary part, and only this auxiliary part of the one capacitor plate is opposite the other of the capacitor plates when the capacitor is in its first position. The auxiliary part of this one capacitor plate is adjustable toward and away from the other capacitor plate, thereby to allow the minimum capacitance of the capacitor to be adjusted.

Additional objects and advantages of the present invention will become apparent upon consideration of the following description when taken in conjunction with the accompanying drawings in which.

Figure 1:
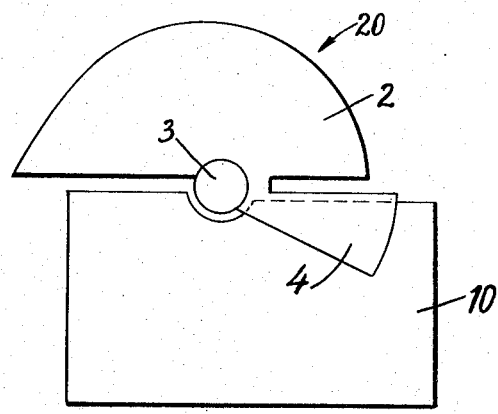
FIGURE 1 illustrates one embodiment of a capacitor according to the present invention.

Referring now to the drawings and first to FIGURE 1 thereof in partciular, the same shows two cooperating capacitor plates 10 and 20 of a rotary capacitor, the plate 10 being the stationary or so-called stator plate, which serves as the counter electrode for the rotor plate 20, the latter being mounted on an axially extending rotatable shaft 3. The rotor plate 20 has a main part 2 and an adjustable auxiliary part 4 which, in the embodiment of FIGURE 1, is constituted by a segment. This segment is so arranged that when the plate 20 is in its fully turned out position; i.e., a position in which no portion of its main part 2 is opposite the counter electrode constituted by the plate 10, the part 4 itself is opposite the plate 10. The starting capacitance of the rotary capacitor; i.e., the capacitance which the rotary capacitor has in its minimum capacitance position wherein the main portion 2 is wholly out of alignment with the plate 10, can be adjusted by bending the part 4 axially; i.e., laterally either toward or away from the plate 10.

The part 4 and the stator plate 10 of the rotary capacitor together thus act as a trimmer capacitor whose capacitance is added to that of the main capacitor, constituted by the main part 2 of the rotor plate 20 and the stator plate 10. The desired capacitance value, as well as the desired capacitance characteristic of the rotary capacitance; i.e., the capacitance of the capacitor as a function of the angular position of the shaft 3, may be obtained by properly dimensioning the part 4, in a manner which may be determined empirically. In this way, too, the capacitance of the particular capacitor formed by the plates 10 and 20 may be conformed to the capacitance characteristic of other capacitors whose rotary plates are carried by the same shaft 3, namely, capacitors which comprise a plurality of sets each having its own stationary and rotary plates.

In practice, the plate 20 shown in FIGURE 1 may be one of the two outside or end plates of a stack of ganged rotor plates, and be provided with radial slits so as to enable the ganged capacitors to be calibrated, as will be explained in conjunction with the embodiment of FIGURE 2.

Figure 2:
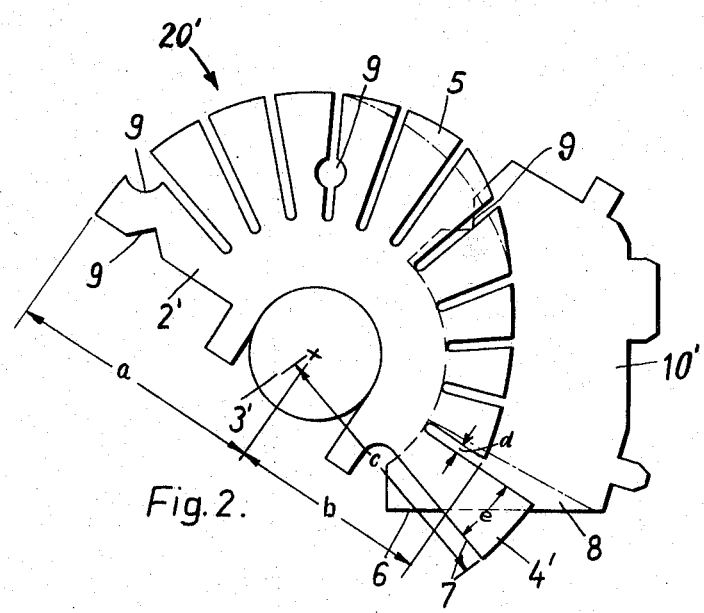
FIGURE 2 illustrates another embodiment of a capacitor according to the present invention.

In the embodiment of FIGURE 2, the rotor plate 20', which may be one of a stack of ganged rotor plates or which may represent, at the least, one of the two end plates of such a stack carried by the shaft 3', is provided with a main part 2' and an adjustable auxiliary part 4' in the form of a segment which, when the main part 2' is completely turned out, still overlaps the stator plate 10'. As in the embodiment of FIGURE 1, the initial capacitance of the capacitor may be increased or decreased by laterally bending the segment.

The stator plate 10' is smaller than the rotor plate 20', in the sense that the angle subtended by the stator is smaller than the angle subtended by the main part 2' of the rotor 20' and hence smaller than the angle through which the rotor 20' must be turned as it moves from the position where the capacitance of the capacitor is at a minimum to the position where the capacitance is at a maximum. As a result, a certain point on the main part 2' of the rotor plate 20' comes to lie opposite the stator plate 10' just as the auxiliary part 4 ceases to lie opposite this stator plate. In order to avoid an abrupt change in the capacitance characteristic of the capacitor during this phase of its operation, the rotor plate 20' is provided with a compensating part 5 which, in the illustrated embodiment, lies in the region of the edge of the rotor plate and is angularly spaced from the auxiliary part 4 an angle that is generally equal to the angle subtended by the stator plate, so that as the rotor plate is turned from its minimum capacitance position to its maximum capacitance position, the compensating part 5 comes to lie opposite the stator plate 10' as the auxiliary part 4 ceases to lie opposite the stator plate. The dimensioning of the compensating part may also be determined empirically.

In order to make it unnecessary to enlarge the rotor plate too much in the region of the compensating part 5, or at least in order to maintain the enlargement relatively small, the stator may be provided with an extension 8 whose edge 6 forms an angle with the edge 7 of the auxiliary part 4'. In this way, the rate at which the capacitance decreases as a function of angular rotation is smaller than if the edges 6 and 7 were parallel to each other.

Instead of fashioning the edges as shown in FIGURE 2, the edges 6 and/or 7 may be angled or arcuate.

FIGURE 2 also shows the peripheral edge region of the rotary capacitor plate 20' as being provided with generally radially oriented slits, thereby to form individually adjustable portions which may serve as calibrating electrodes. As shown in FIGURE 2, the auxiliary part 4 has a size and configuration different from that of the calibrating electrodes.

In practice, the rotor and/or stator plates may be provided with mounting cut-outs and/or projections and/or bores, shown variously at 9.

The present invention is particularly suitable for use in capacitatively tuned television channel selectors incorporating tank circuits which tune the television receiver in the UHF (ultra-high frequency) range, inasmuch as the trimmer capacitors which were heretofore used in such tank circuits for mounting the inner conductor and which were found to be not only expensive but also—especially in the UHF range—highly susceptible to breakdown and malfunctions, can now be replaced by support elements made of insulating material. Such support elements are preferably fashioned simply as fixed capacitances.

It will thus be seen that the separate trimmer capacitors can be eliminated in favor of the capacitor according to the present invention in which the trimmer capacitor is combined with the main capacitor itself.

A capacitor according to FIG. 2 has been dimensioned as follows:

(a) Length of left edge of part 2' _____mm__ 10
(b) Length of right edge of part 2' _____mm__ 7.5
(c) Length of lower edge of part 4' _____mm__ 10
(d) Width of the slot between parts 2' and 4' __mm__ 0.4
(e) Angle between the edge of parts 4'
and 2' _____degrees__ 18

It will be understood that the above description of the present invention is susceptible to various modifications, changes, and adaptations, and the same are intended to be comprehended within the meaning and range of equivalents of the appended claims. For example, the present invention is not limited to rotary capacitors, but may also be used to advantage in other variable capacitors as, for example, in slide-type capacitors or the like.

What is claimed is:

1. A variable capacitor comprising two cooperating capacitor plates mounted for movement with respect to each other between a first position wherein the capacitance of the capacitor is at a minimum and a second position wherein the capacitance of the capacitor is at a maximum, one of said capacitor plates having a main part and an auxiliary part, only said auxiliary part of said one capacitor plate being opposite the other of said capacitor plates when the capacitor is in said first position thereof, said auxiliary part of said one capacitor plate being adjustable toward and away from said other capacitor plate, thereby to allow the minimum capacitance of the capacitor to be adjusted, said auxiliary part of said one capacitor plate being not opposite said other capacitor plate when the capacitor is in its second position, said capacitor further comprising means for preventing an abrupt change in the capacitance characteristic of the capacitor at the point where said auxiliary part of said one capacitor plate ceases to be opposite said other capacitor plate.

2. A capacitor as defined in claim 1 wherein said one capacitor plate is provided with means forming calibrating electrodes and wherein said auxiliary part has a size and configuration different from that of said calibrating electrodes.

3. A capacitor as defined in claim 1, said capacitor being a rotary capacitor and said one capacitor plate being a rotatably mounted capacitor plate.

4. A capacitor as defined in claim 1 wherein said auxiliary part of said one capacitor plate is configured to constitute said means.

5. A capacitor as defined in claim 1 wherein said means comprise a compensating part carried by said one capacitor plate at a point thereon which comes to lie opposite said other capacitor plate as said auxiliary part of said one capacitor plate ceases to be opposite said other capacitor plate.

6. A capacitor as defined in claim 1 wherein said other capacitor plate is configured to constitute said means.

7. A capacitor as defined in claim 1, said capacitor being a rotary capacitor and said one capacitor plate being a rotatably mounted capacitor plate and said other capacitor plate being a stationary plate, the angle subtended by said stationary plate being smaller than the angle through which said rotary plate is turned as the capacitor is moved from said first to said second position thereof.

8. A capacitor as defined in claim 7, further comprising means for preventing an abrupt change in the capacitance characteristic of the capacitor at the point where said auxiliary part of said rotary plate ceases to lie opposite said stationary plate as said capacitor is turned from its first position to its second position.

9. A capacitor as defined in claim 8 wherein said means comprise a compensating part which is carried by said rotary capacitor plate and which is angularly spaced from said auxiliary part an angle equal to the angle subtended by said stationary plate.

10. A capacitor as defined in claim 8 wherein said means comprise an end part carried by said stationary capacitor plate and having an edge which forms an angle with an edge of said auxiliary part of said rotary capacitor plate, thereby to produce a gradual change in the capacitor characteristics of the capacitor as said auxiliary part of said rotary capacitor plate moves past said end portion of said stationary capacitor plate.

11. A capacitor as defined in claim 10 wherein at least one of said edges is angled or arcuate.

12. A capacitor as defined in claim 1 wherein at least one of said capacitor plates is provided with at least one of the following: mounting cut-outs, projections, bores.

13. A capacitor as defined in claim 8 and being a ganged capacitor having a plurality of stationary plates and stacked rotary plates, said means being provided on at least one of the two rotary plates which are arranged at the end of the stack of rotary plates.

14. A capacitor as defined in claim 1 and being a ganged capacitor having a plurality of stationary plates and stacked rotary plates, at least one of the two rotary plates which are arranged at the end of the stack of rotary plates being provided, in the region of its peripheral edge, with radial slits which divide said region into individually adjustable portions.

References Cited by the Examiner

UNITED STATES PATENTS

| | | | |
|---|---|---|---|
| 1,951,532 | 3/1934 | Scheen | 334—82 |
| 2,123,050 | 7/1938 | Johnson | 317—253 |
| 3,015,766 | 1/1962 | Repko | 317—253 |

FOREIGN PATENTS 1,356,588  2/1964  France.

OTHER REFERENCES

Dummer et al., Fixed and Variable Capacitors, McGraw-Hill, New York, 1960, p. 203.

LEWIS H. MYERS, *Primary Examiner.*

LARAMIE E. ASKIN, *Examiner.*

E. GOLDBERG, *Assistant Examiner.*

Notice of Adverse Decision in Interference

In Interference No. 97,870 involving Patent No. 3,292,060, E. Schatter and K. Schwarz, VARIABLE CAPACITOR, final judgment adverse to the patentees was rendered June 30, 1972, as to claims 1, 2, 3 and 6.

[*Official Gazette August 22, 1972.*]